US012566254B2

(12) United States Patent
Lagnado et al.

(10) Patent No.: US 12,566,254 B2
(45) Date of Patent: Mar. 3, 2026

(54) DEVICE SEPARATION MONITORS

(71) Applicant: HEWLETT-PACKARD DEVELOPMENT COMPANY, L.P., Spring, TX (US)

(72) Inventors: Isaac Lagnado, Spring, TX (US); Tzuya Henderson, Spring, TX (US); Charles J Stancil, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 485 days.

(21) Appl. No.: 17/995,952

(22) PCT Filed: Apr. 17, 2020

(86) PCT No.: PCT/US2020/028688
§ 371 (c)(1),
(2) Date: Oct. 11, 2022

(87) PCT Pub. No.: WO2021/211132
PCT Pub. Date: Oct. 21, 2021

(65) Prior Publication Data
US 2023/0184914 A1      Jun. 15, 2023

(51) Int. Cl.
*G01S 11/06*          (2006.01)
*G01S 5/00*           (2006.01)

(52) U.S. Cl.
CPC ............... *G01S 11/06* (2013.01); *G01S 5/014* (2020.05)

(58) Field of Classification Search
CPC .......... G01S 11/06; G01S 5/014; G01S 13/56; G01S 13/878; G01S 13/931; G01S 19/03; G01S 19/05; G01S 13/04; G01S 13/75; G01S 19/13; G01S 19/14; G01S 19/42; G01S 7/415; G01S 2013/93271; G01S 5/0027; G01S 5/14; H04W 4/029; H04W 4/80; H04W 4/021; H04W 4/02; H04W 4/38; H04W 64/00; H04W 4/40; H04W 52/0216; H04W 52/0245; H04W 88/02; H04W 12/63; H04W 92/18; H04W 12/50; H04W 12/48; H04W 36/322
See application file for complete search history.

(56) References Cited

U.S. PATENT DOCUMENTS 8,570,168 B2    10/2013   Logan et al.
8,947,222 B2     2/2015   DeLuca
9,467,825 B2    10/2016   Slay, Jr. et al.
(Continued)

FOREIGN PATENT DOCUMENTS

WO          2015/008428 A1      1/2015

*Primary Examiner* — Diane D Mizrahi
*Assistant Examiner* — Jing Gao
(74) *Attorney, Agent, or Firm* — Quarles & Brady LLP

(57)          ABSTRACT
Examples of device separation monitors are described herein. In some examples, a first electronic device may include a memory. In some examples, the first electronic device may include a processor in electronic communication with the memory. In some examples, the processor may monitor for separation from a second electronic device based on a geographic location detection zone. In some examples, the processor may detect a zone type switch event. In some examples, the processor may monitor for separation from the second electronic device based on a wireless detection zone in response to detecting the zone type switch event.

18 Claims, 6 Drawing Sheets

Building 218
Building Security Device 220
Vehicle 224

First Electronic Device *202*
Second Electronic Device *216*

(56)                    References Cited

U.S. PATENT DOCUMENTS

| | | | |
|---|---|---|---|
| 9,521,525 B2 | 12/2016 | Le et al. | |
| 9,821,767 B2 | 11/2017 | Nixon | |
| 9,860,679 B2 * | 1/2018 | Kane ...................... | H04W 4/80 |
| 2014/0277935 A1 | 9/2014 | Daman et al. | |
| 2017/0070862 A1 | 3/2017 | Buttolo et al. | |
| 2017/0301206 A1 | 10/2017 | Braxton | |
| 2018/0075721 A1 * | 3/2018 | Oliver ................... | G08B 21/24 |

* cited by examiner

Second Electronic Device 216

228

First Electronic Device 202

222

Building 218

Building Security Device 220

Vehicle 224

226

Figure 5:
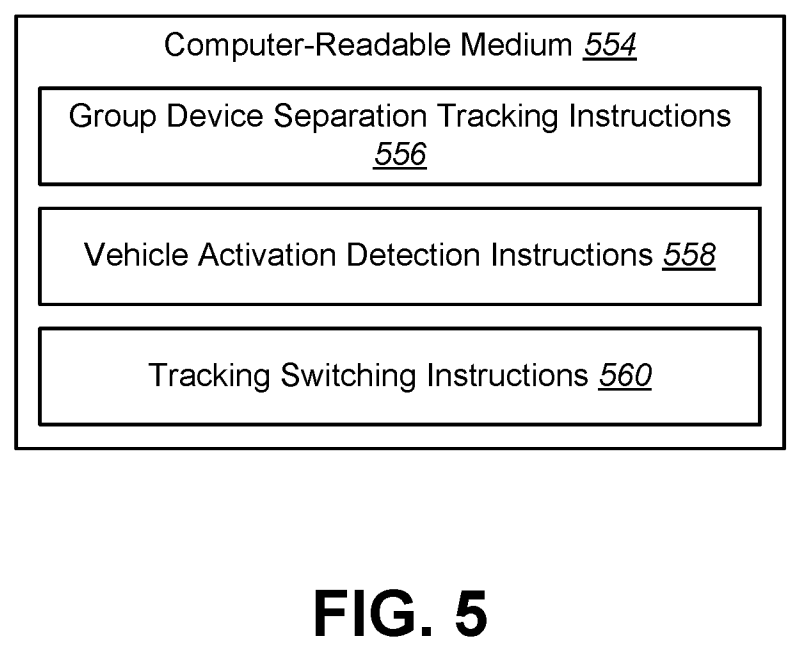

Computer-Readable Medium *554*

Group Device Separation Tracking Instructions *556*

Vehicle Activation Detection Instructions *558*

Tracking Switching Instructions *560*

Zone type switch event detected? 602

No

Yes

Wireless signal received from group device? 606

No

Yes

Signal strength satisfies threshold? 608

No

Yes

Second zone type switch event detected? 610

No

Yes

Group device location within distance range? 604

Yes

No

Provide an alert 612

DEVICE SEPARATION MONITORS

BACKGROUND

Electronic technology has advanced to become virtually ubiquitous in society and has been used to improve many activities in society. For example, electronic devices are used to perform a variety of tasks, including work activities, communication, research, and entertainment. Different varieties of electronic circuitry may be utilized to provide different varieties of electronic technology.

BRIEF DESCRIPTION OF THE DRAWINGS

FIG. 5 is a block diagram illustrating an example of a computer-readable medium for tracking group device separation.

DETAILED DESCRIPTION

Figure 1:
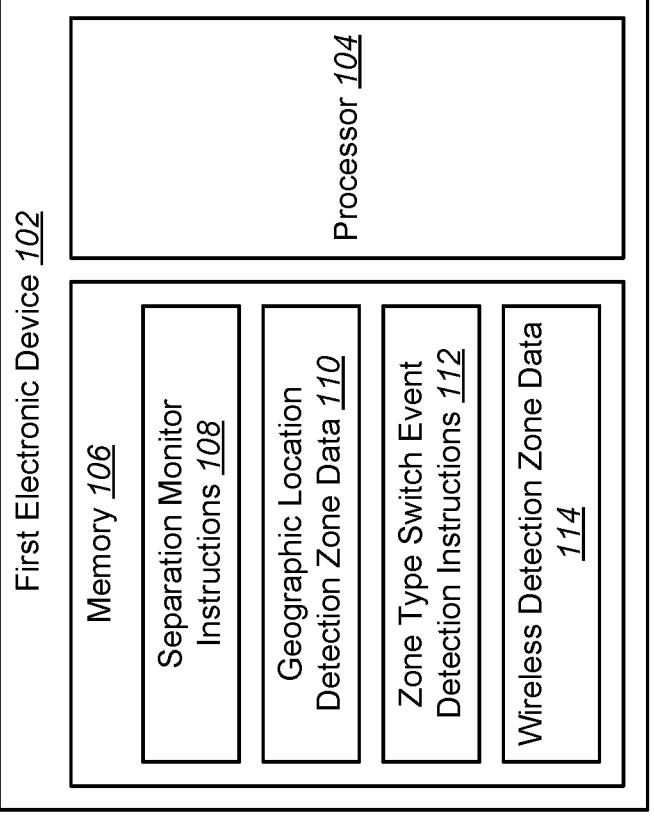
FIG. 1 is a block diagram of an example of an electronic device that may be utilized to monitor device separation.

An electronic device may be a device that includes electronic circuitry. For instance, an electronic device may include integrated circuitry (e.g., transistors, digital logic, semiconductor technology, etc.). Examples of electronic devices include computing devices, laptop computers, desktop computers, smartphones, tablet devices, wireless communication devices, game consoles, smart appliances, vehicles with electronic components, aircraft, drones, robots, smart appliances, tracking devices, Internet of Things (IoT) devices, etc.

A tracking device may be a device to provide location and/or tracking functionality. For example, a tracking device may utilize wireless signaling to indicate a current and/or past location of the tracking device. In some examples, a tracking device may transmit a signal (e.g., beacon, advertisement signal, etc.) that may indicate a location of the tracking device and/or may indicate a proximity of the tracking device to another electronic device (e.g., receiving device).

In some examples of the electronic devices described herein, a tracking device and/or other wireless communication device (e.g., IoT device) may be included in and/or integrated into a host device. A host device may be a device that includes an electronic device or devices (e.g., a tracking device). The tracking device and/or other wireless communication device may be utilized to track, locate, and/or send a signal from the host device.

In some approaches, an electronic device may be utilized to track and/or locate an item or electronic device that has become lost. In some approaches, electronic devices may be grouped, such that when a group electronic device becomes separated from another group electronic device, an alert may be triggered. For example, a group may be established that includes a laptop computer and a smartphone. If the laptop computer is left at home, the smartphone may trigger an alert (e.g., message) that the laptop computer has become separated (e.g., has been left home).

In some approaches, a received signal strength indicator (RSSI) may be utilized to determine whether the laptop computer has become separated from the smartphone. However, a wireless signaling range may be relatively small (e.g., approximately 300 feet) in some cases, which may cause a false trigger. For example, if RSSI is being used, then a laptop computer that is left in a bedroom of a house may trigger a warning when the laptop computer no longer detects the smartphone that is located in another room of the house. Accordingly, tracking that utilizes RSSI may cause false triggers in some cases, because the wireless signal may have about 300 feet in range, and many buildings (e.g., homes, offices, etc.) may be larger than the wireless signal range.

Due to a short wireless signaling range (e.g., approximately 300 feet), a received signal strength indicator (RSSI) may cause false alert triggers when utilized as an indication of co-location. In some approaches, geographic zones (e.g., global positioning system (GPS) zones) may be utilized instead to indicate when devices are no longer in close proximity. By enlarging the detection zones, false triggers may be reduced. However, enlarging the detection zones may also reduce the benefits of tracking in some cases. For example, once a user is 2 miles away from home (e.g., driving down the freeway), it is less beneficial to then receive an alert that the laptop computer was left at home. For instance, as the smartphone moves away from the home, no alert may be triggered. For instance, a user may start driving away from the home with a smartphone but may be unaware that he has left his laptop computer behind until he has traveled a relatively large distance.

Some examples of the techniques described herein may enable beneficial electronic device tracking. For instance, some of the techniques may enable zone monitoring switching, which may improve tracking while reducing false alerts.

Throughout the drawings, identical or similar reference numbers may designate similar, but not necessarily identical, elements. The figures are not necessarily to scale, and the size of some parts may be exaggerated to more clearly illustrate the example shown. Moreover, the drawings provide examples in accordance with the description; however, the description is not limited to the examples provided in the drawings.

FIG. 1 is a block diagram of an example of an electronic device 102 that may be utilized to monitor device separation. Examples of the electronic device 102 may include tracking devices, computing devices, laptop computers, smartphones, tablet devices, wireless communication devices, game consoles, vehicles with electronic components, aircraft, drones, robots, etc. In some examples, the electronic device 102 may be included in a host device. For instance, the electronic device 102 may be a tracking device that is included in a laptop computer as a host device. In some examples, the electronic device 102 may perform one, some, or all of the functions, operations, elements, procedures, etc., described in one, some, or all of FIG. 1-6.

In some examples, the electronic device 102 may include a processor 104 and/or a memory 106. The processor 104 may be any of a central processing unit (CPU), a semiconductor-based microprocessor, graphics processing unit (GPU), field-programmable gate array (FPGA), an application-specific integrated circuit (ASIC), and/or other hardware device suitable for retrieval and execution of instructions stored in the memory 106. The processor 104 may fetch, decode, and/or execute instructions stored in the memory 106.

The memory 106 may be any electronic, magnetic, optical, and/or other physical storage device that contains or stores electronic information (e.g., instructions and/or data). The memory 106 may be, for example, Random Access Memory (RAM), Electrically Erasable Programmable Read-Only Memory (EEPROM), Dynamic Random Access Memory (DRAM), Synchronous DRAM (SDRAM), magnetoresistive random-access memory (MRAM), phase change RAM (PCRAM), memristor, flash memory, a storage device, and/or an optical disc, etc. In some examples, the memory 106 may be a non-transitory tangible machine-readable storage medium, where the term "non-transitory" does not encompass transitory propagating signals. The processor 104 may be in electronic communication with the memory 106. In some examples, a processor 104 and/or memory 106 of the electronic device 102 may be combined with or separate from a processor (e.g., CPU) and/or memory of a host device.

In some examples, the electronic device 102 may include an input/output interface (not shown) through which the electronic device 102 may communicate with an external and/or remote device or devices (not shown). The input/output interface may include hardware and/or machine-readable instructions to enable the processor 104 to communicate with the external and/or remote device or devices. The input/output interface may enable a wired or wireless connection to the external and/or remote device or devices. In some examples, the input/output interface may further include a network interface card and/or may also include hardware and/or machine-readable instructions to enable the processor 104 to communicate with various input and/or output devices, such as a keyboard, a mouse, a display, another apparatus, electronic device, computing device, etc., through which a user may input instructions and/or indications into the electronic device 102.

In some examples, the electronic device 102 may include a transmitter or transmitters to send a signal or signals. For instance, the electronic device 102 may include a transmitter to transmit a wireless signal or signals (e.g., communication signal, beacons, advertising signal(s), etc.).

In some examples, the electronic device 102 may include a receiver or receivers to receive a signal or signals. For example, the receiver may be coupled to an antenna or antennas of the electronic device 102 and/or of a host device to receive a wireless signal. A wireless signal may be an electromagnetic signal and/or radio signal. Examples of wireless signals may include positioning signals, beacons, communication signals, etc.

A positioning signal may be a wireless signal used for positioning. Examples of positioning signals may include satellite signals, terrestrial positioning node signals, access point signals, communication tower signals, etc. For example, the first electronic device 102 may receive a positioning signal or signals to determine a geographic position or location of the first electronic device 102. For instance, the first electronic device 102 may receive global positioning system (GPS) signals, which may be utilized to determine a geographic location of the first electronic device 102.

A beacon may be a wireless signal sent from an electronic device. For example, a beacon may provide an indication of electronic device presence, location, and/or activity. For instance, a second electronic device 116 may send a beacon or beacons to indicate the presence, location, and/or activity of the second electronic device 116. In some examples, a beacon may be transmitted repeatedly and/or periodically. In some examples a beacon may be transmitted according to a schedule. When within range, the first electronic device 102 may receive the beacon or beacons to determine the presence, location, and/or activity of the second electronic device 116. In some examples, a beacon may be referred to as an advertising signal. In some examples, a beacon may be utilized by a receiving electronic device (e.g., the first electronic device 102) to set up a communications link. In some examples, a beacon may be a Bluetooth beacon or advertising signal. In some examples, a beacon may include or indicate an identifier or identifiers (e.g., device identifier, media access control (MAC) number, etc.). For instance, the second electronic device 116 may send a beacon that identifies the second electronic device 116.

An example of a second electronic device 116 is also illustrated in FIG. 1. Examples of the second electronic device 116 may include tracking devices, computing devices, laptop computers, smartphones, tablet devices, wireless communication devices, game consoles, vehicles with electronic components, aircraft, drones, robots, etc. In some examples, the second electronic device 116 may include circuitry (e.g., integrated circuitry, semiconductor circuitry, electronic component(s), etc.). For example, the second electronic device 116 may include digital logic circuitry, transistors, memory, etc. In some examples, the electronic device 102 may execute instructions and/or code to perform an operation or operations. In some examples, the second electronic device 116 may include a transmitter and/or a receiver. For instance, the second electronic device 116 may send a wireless signal or signals (e.g., beacon(s)).

In some examples, the second electronic device 116 may be a group device. A group device may be a device that is part of an indicated group of devices. For instance, the first electronic device 102 may maintain a record of group devices that are in the group. In some examples, the group of devices may be determined and/or established based on an input or inputs. For instance, the first electronic device 102 may receive a user input, a wireless signal input, an interface device input, etc., that indicates a device or devices that are in the group of devices. In the example of FIG. 1, the first electronic device 102 and the second electronic device 116 may be group devices in a group. While two electronic devices are illustrated in a group in the example of FIG. 1, a different number of electronic devices (e.g., 3, 4, 5, 8, 10, etc.) may be included in a group in other examples. A group of devices may be monitored and/or tracked for separation from each other.

The first electronic device 102 may monitor for separation from a group device or devices (e.g., the second electronic device 116). In some examples, the memory 106 may include and/or store separation monitor instructions 108. The separation monitor instructions 108 may be instructions for monitoring whether the first electronic device 102 and another device (e.g., the second electronic device 116) are separated or have become separated. For example, the processor 104 may execute the separation monitor instructions 108 to detect and/or determine whether the first electronic device 102 and the second electronic device 116 are separated or have become separated.

Separation between devices may be a separation over a physical distance. Separation may be defined and/or determined in terms of a criterion or criteria. For example, separation may be defined and/or determined in terms of a geographical distance (e.g., 500 feet, 500 meters (m), a kilometer (km), a mile, 2 miles, etc.). For instance, if the first electronic device 102 is located greater than a geographical distance from the second electronic device 116, the first electronic device 102 and the second electronic device 116 may be deemed and/or determined to be separated. In some examples, separation may be defined and/or determined in terms of a last recorded location. For example, the first electronic device 102 may record and/or periodically update in memory 106 a location or locations of an electronic device or devices (e.g., group device(s), the second electronic device 116) that are detected by the first electronic device 102. For example, the first electronic device 102 may record a position or location associated with the second electronic device 116 when the first electronic device 102 receives a wireless signal (e.g., beacon) from the second electronic device 116. The position or location associated with the second electronic device 116 may be a position or location of the first electronic device 102 (determined from positioning signal(s), for example) when the first electronic device 102 receives a wireless signal from the second electronic device 116, and/or may be a position or location of the second electronic device 116 that is signaled to the first electronic device 102.

In some examples, separation may be defined and/or determined in terms of wireless signaling range. For instance, if the first electronic device 102 is located greater than a wireless signaling range from the second electronic device 116, the first electronic device 102 and the second electronic device 116 may be deemed and/or determined to be separated. A wireless signaling range may be defined in terms of reception ability and/or signal attenuation. For example, if the first electronic device 102 cannot receive a wireless signal or beacon from the second electronic device 116 and/or if a received wireless signal or beacon from the second electronic device 116 is attenuated to a degree (e.g., wireless signal strength, amplitude, magnitude, or received signal strength indicator (RSSI), bit loss rate, signal-to-noise ratio (SNR), and/or energy per bit to noise power spectral density ratio (Eb/N0), etc., is less than a threshold), then the second electronic device 116 may be deemed and/or determined to be separated from the first electronic device 102.

In some examples, the first electronic device 102 may monitor for separation from the group device(s) (e.g., second electronic device 116) in accordance with a condition or trigger. In the context of monitoring, a condition or trigger may be a condition or trigger for determining whether separation has occurred. For example, the first electronic device 102 may determine whether separation has occurred when a condition is met. Examples of a condition for monitoring may include a geographic location detection zone and a wireless detection zone. In some examples, the electronic device 102 may perform monitoring for multiple group devices. For instance, the electronic device 102 may monitor for multiple group devices using a geographic location detection zone or zones and/or using a wireless detection zone or zones.

In some examples, the processor 104 may monitor for separation from the second electronic device 116 based on a geographic location detection zone. A geographic location detection zone is a geographic distance or area to determine whether electronic devices are separated. For example, when monitoring for separation based on a geographic location detection zone, the first electronic device 102 (e.g., processor 104) may utilize a position or location of the first electronic device 102 and a position or location associated with the second electronic device 116 to determine whether the first electronic device 102 and the second electronic device 116 are separated. In some examples, the memory

106 may store geographic location detection zone data 110. The geographic location detection zone data 110 may include and/or indicate a position or location associated with group device(s) (e.g., the second electronic device 116), a position or location of the first electronic device 102, and/or data defining a geographic location detection zone. For instance, the geographic location detection zone data 110 may include a last recorded position or location associated with the second electronic device 116. The geographic location detection zone data 110 may include a position or location (e.g., GPS position or location) of the first electronic device 102 that is determined based on positioning signal(s). The geographic location detection zone data 110 may include data defining the geographic location detection zone, such as a geographic distance (e.g., 500 m, 1 mile, 1 km, 1.5 miles, etc.). For instance, a geographic location detection zone may be defined as an area within the geographic distance from a position or location of a group device (e.g., the second electronic device 116). For example, the geographic location detection zone may be a circular zone centered on the position or location associated with the second electronic device 116.

Monitoring for separation from the second electronic device 116 may include determining whether the first electronic device 102 is outside of the geographic location detection zone. For example, to monitor for separation from the second electronic device 116 based on the geographic location detection zone, the processor 104 may determine whether a first electronic device 102 location is outside of (or within) the geographic location detection zone from the second electronic device 116. For instance, the processor 104 may determine whether the first electronic device 102 location is greater than a geographic distance from the location associated with the second electronic device 116. For instance, the processor 104 may calculate a vector length based on the first electronic device 102 location (e.g., coordinates) and a location associated with the second electronic device 116 (e.g., coordinates), and may compare the vector length with the geographic distance. In some examples, the processor 104 may determine whether the location associated with the second electronic device 116 is greater than a geographic distance from the first electronic device 102 location. In some examples, a separation determination based on a geographic location detection zone may be performed without using wireless signal quality (e.g., strength, amplitude, magnitude, RSSI, bit loss rate, SNR, Eb/N0, etc.). For instance, a separation determination based on a geographic location detection zone may be performed without determining whether a beacon signal quality (e.g., strength, amplitude, magnitude, RSSI, bit loss rate, SNR, Eb/N0, etc.) meets a criterion or criteria in some examples.

The first electronic device 102 may provide an alert if the first electronic device 102 location is outside of the geographic location detection zone. For instance, to monitor for separation from the second electronic device 116 based on the geographic location detection zone, the processor 104 may provide an alert in response to determining that the first electronic device location is outside of the geographic location detection zone. An alert may be an indication that group devices have become separated. Examples of alerts may include a sound, audio, speech, tone, visual indicator (e.g., display flash, characters, etc.), text message, phone call, and/or haptic indicator, etc.

In some examples, the first electronic device 102 may detect a zone type switch event. A zone type switch event may be an event to trigger a switch from a geographic location detection zone to a wireless detection zone, or an event to trigger a switch from a wireless detection zone to a geographic location detection zone. Examples of a zone type switch event may include detecting a wireless signal from a vehicle, activation of a vehicle, and/or detecting arming of a building security device (e.g., home security system, facility security system, etc.).

In some examples, the memory 106 may include zone type switch event detection instructions 112. The processor 104 may execute the zone type switch event detection instructions 112 to detect a zone type switch event. For example, to detect the zone type switch event, the processor may detect a wireless signal from a vehicle. In some examples, a wireless signal (e.g., beacon, Bluetooth beacon, etc.) from the vehicle may be detectable after activation of the vehicle (e.g., after activating electronics of a vehicle and/or after activating an engine of a vehicle). In some examples, the first electronic device 102 may store vehicle identification information (e.g., for a registered or user-designated vehicle). Vehicle identification information may be information that identifies a wireless signal from a vehicle. For example, the first electronic device 102 (e.g., memory 106) may store a MAC address, Bluetooth identifier, or other identifier that indicates whether a wireless signal (e.g., beacon) is being sent from a vehicle (e.g., vehicle electronics). When the first electronic device 102 receives a wireless signal, the first electronic device 102 (e.g., processor 104) may compare identifier information from the wireless signal with the vehicle identification information. In a case that the identifier information matches the vehicle identification information, the first electronic device (e.g., processor 104) may detect the zone type switch event. In some examples, detecting a wireless signal from a vehicle (e.g., beacon from a designated vehicle) may be zone type switch event to switch to a wireless detection zone from a geographic location detection zone.

In some examples, to detect the zone type switch event, the processor may detect satisfaction of a proximity criterion or criteria based on a wireless signal from a vehicle. A proximity criterion may be a criterion to determine whether an electronic device is near or in a vehicle. Examples of a proximity criterion may include a criterion or criteria (e.g., threshold(s)) for a signal quality (e.g., strength, amplitude, magnitude, RSSI, bit loss rate, SNR, and/or Eb/N0, etc.) of a wireless signal from a vehicle. For example, if a signal strength of a wireless signal from a vehicle is greater than a threshold (e.g., −50 dBm, −40 dBm, etc.), the first electronic device 102 may detect a zone type switch event. For example, the processor 104 may monitor for separation from the second electronic device 116 based on the geographic location detection zone (or a different second geographic location detection zone, for instance) in response to detecting the zone type switch event. In some examples, proximity criterion approach may be beneficial in cases where vehicle signaling remains active when the vehicle is deactivated.

In some examples, to detect the zone type switch event, the processor may detect a loss of a wireless signal from a vehicle. In some examples, loss of a wireless signal (e.g., beacon, Bluetooth beacon, etc.) from the vehicle may be detectable after deactivation of the vehicle (e.g., after deactivating electronics of a vehicle and/or after deactivating an engine of a vehicle). In some examples, detecting a loss of a wireless signal from a vehicle (e.g., beacon from a designated vehicle) may be zone type switch event to switch to a geographic location detection zone from a wireless detection zone. For example, the processor 104 may monitor for separation from the second electronic device 116 based on the geographic location detection zone (or a different second geographic location detection zone, for instance) in response to detecting the zone type switch event. In some examples, switching to a geographic location detection zone may be conditioned on whether the first electronic device 102 is located at a designated location (e.g., home, office, etc.).

In some examples, to detect the zone type switch event, the processor may detect arming of a building security device. For instance, the first electronic device 102 may receive a signal from a building security device (e.g., a signal directly from a building security device and/or a signal from a building security device over a network(s), such as a local area network (LAN), cellular network, and/or the Internet) indicating that a building security device is armed. In some examples, the first electronic device 102 may include an application for monitoring and/or arming a building security system. The processor 104 may detect the arming of a building security device by detecting an event, such as an input on the first electronic device 102 and/or an application action to arm the building security device. In some examples, detecting arming of a building security device may be a zone type switch event to switch to a wireless detection zone from a geographic location detection zone.

In some examples, to detect the zone type switch event, the processor may detect disarming of a building security device. For instance, the first electronic device 102 may receive a signal from a building security device (e.g., a signal directly from a building security device and/or a signal from a building security device over a network(s), such as a local area network (LAN), cellular network, and/or the Internet) indicating that a building security device is disarmed. In some examples, the processor 104 may detect the disarming of a building security device by detecting an event, such as an input on the first electronic device 102 and/or an application action to disarm the building security device. In some examples, detecting disarming of a building security device may be zone type switch event to switch to a geographic location detection zone from a wireless detection zone.

In some examples, the first electronic device 102 may monitor for separation from the second electronic device 116 based on a wireless detection zone. For instance, the processor 104 may monitor for separation from the second electronic device 116 based on a wireless detection zone in response to detecting the zone type switch event. A wireless detection zone is an area to determine whether electronic devices are separated based on wireless signaling. For example, when monitoring for separation based on a wireless detection zone, the first electronic device 102 (e.g., processor 104) may determine whether a wireless signal is received from the second electronic device 116 and/or whether a signal quality (e.g., signal strength, amplitude, magnitude, RSSI, bit loss rate, SNR, Eb/N0, etc.) meets a criterion or criteria to determine whether the first electronic device 102 and the second electronic device 116 are separated. In some examples, the memory 106 may store wireless detection zone data 114. The wireless detection zone data 114 may include and/or indicate device identifier(s) for group device(s), device identifier(s) for received wireless signal(s) (e.g., beacons), and/or data defining a criterion or criteria for a wireless detection zone. For instance, the wireless detection zone data 114 may include device identifier(s) (e.g., MAC address(es), Bluetooth identifier(s), and/or other identifier(s)) for wireless signal(s) received by the first electronic device 102 within a period (e.g., 30 seconds, 1 minute, 5 minutes, etc.). The wireless detection zone data

114 may include a criterion or criteria for the wireless detection zone, such as a signal quality threshold (e.g., a threshold for signal strength, amplitude, magnitude, RSSI, bit loss rate, SNR, and/or Eb/N0, etc.). For instance, a wireless detection zone may be defined as an area within which a wireless signal from a group device (e.g., the second electronic device 116) is received and/or meets a criterion or criteria. For example, the wireless detection zone may be a zone within which the first electronic device 102 may receive a wireless signal (e.g., beacon) from the second electronic device 116 and/or within which a wireless signal (e.g., beacon) meets a signal quality criterion (e.g., greater than a threshold strength, amplitude, magnitude, RSSI, bit loss rate, SNR, or Eb/N0, etc.).

In some examples, monitoring for separation from the second electronic device 116 may include determining whether the second electronic device 116 is outside of (or within) the wireless detection zone. For example, to monitor for separation from the second electronic device 116 based on the wireless detection zone, the processor 104 may determine whether a wireless signal is received from the second electronic device 116. For instance, the processor 104 may determine whether a wireless signal (e.g., beacon) is received with a device identifier that matches a group device identifier. If a wireless signal is received with a matching device identifier for the second electronic device 116, the processor 104 may determine that the second electronic device 116 is within the wireless detection zone. If a wireless signal is not received corresponding to a group device identifier for the second electronic device 116, the processor 104 may determine that the second electronic device 116 is outside of the wireless detection zone.

The first electronic device 102 may provide an alert if the second electronic device 116 is outside of the wireless detection zone. For instance, to monitor for separation from the second electronic device 116 based on the wireless detection zone, the processor 104 may provide an alert in response to determining that a wireless signal is not received from the second electronic device 116.

In some examples, monitoring for separation from the second electronic device 116 may include determining whether a signal quality criterion is satisfied or criteria are satisfied (e.g., whether a wireless signal strength, amplitude, magnitude, RSSI, bit loss rate, SNR, and/or Eb/N0, etc., satisfies a threshold or satisfy a threshold). For example, in a case that a wireless signal corresponding to a group device (e.g., a wireless signal corresponding to the second electronic device 116) is received, the first electronic device 102 may determine whether a signal quality of the wireless quality meets a criterion or criteria.

For instance, to monitor for separation from the second electronic device 116 based on the wireless detection zone, the processor 104 may determine whether a strength of the wireless signal satisfies a threshold in response to determining that the wireless signal is received from the second electronic device 116. In some examples, the first electronic device 102 (e.g., processor 104) may measure the strength of the received wireless signal. For example, the first electronic device 102 (e.g., processor 104) may determine an amplitude, magnitude, and/or RSSI, etc., based on the received wireless signal. The first electronic device 102 (e.g., processor 104) may compare the strength with the threshold. Examples of the threshold may include −40 decibels relative to one milliwatt (dBm), −45 dBm, −50 dBm, −58 dBm, −60 dBm, etc. For instance, the processor 104 may determine whether a strength (e.g., RSSI) of the wireless signal (e.g., beacon) is greater than the threshold. In a case that the strength is greater than the threshold (e.g., greater than −50 dBm), the first electronic device 102 may determine that the strength satisfies the threshold and/or that the second electronic device 116 is within the wireless detection zone. In a case that the strength is not greater than the threshold (e.g., less than or equal to −50 dBm), the first electronic device 102 may determine that the strength does not satisfy the threshold and/or that the second electronic device 116 is outside of the wireless detection zone.

In some examples, the first electronic device 102 may provide an alert in response to determining that the signal quality of the wireless signal does not satisfy a criterion or criteria and/or if the second electronic device 116 is outside of the wireless detection zone. For instance, to monitor for separation from the second electronic device 116 based on the wireless detection zone, the processor 104 may provide an alert in response to determining that the strength of the wireless signal does not satisfy the threshold.

In some examples, a separation determination based on a wireless detection zone may be performed without using geographic location (e.g., coordinate) information. For instance, a separation determination based on a wireless detection zone may be performed without determining relative locations or speed tracking based on coordinate (e.g., GPS) information in some approaches. In some examples, the electronic device 102 may include additional components and/or some of the components described herein may be removed and/or modified without departing from the scope of this disclosure.

In some examples, monitoring for separation of group devices based on a geographic location detection zone, detecting a zone type switch event, and/or monitoring for separation of group devices based on a wireless detection zone may be performed remotely. For example, a remote electronic device (e.g., network device, cloud server, Internet device, computer, etc.) may monitor for separation between the first electronic device 102 and the second electronic device 116. For example, the first electronic device 102 may send (e.g., transmit) geographic location detection zone data 110 and/or wireless detection zone data 114 (e.g., received scanned beacon information) to a remote electronic device on the Internet. The remote electronic device may store the separation monitor instructions 108 (instead of or in addition to the first electronic device 102) and may include a processor to execute the separation monitor instructions 108 and/or to determine whether the first electronic device 102 and the second electronic device 116 are separated or have become separated. In some examples, the remote electronic device may store zone type switch event detection instructions 112 (instead of or in addition to the first electronic device 102). The remote electronic device may execute the zone type switch event detection instructions 112 to detect a zone type switch event. Accordingly, the remote electronic device may perform separation monitoring for the first electronic device 102 and the second electronic device 116 in accordance with a technique or techniques described herein. The remote electronic device may send a signal (e.g., alert) to the first electronic device 102 in a case that a separation is detected. In some examples, the first electronic device 102 may monitor for separation between the second electronic device 116 and a third electronic device (not shown in FIG. 1). For example, the first electronic device 102 may receive geographic location detection zone data 110 and/or wireless detection zone data 114 pertaining to the second electronic device 116 and the third electronic device. The first electronic device 102 may detect a zone type switch event and/or monitor for separation between the second electronic device and the third electronic device based on the received data. In a case that a separation is detected, the first electronic device 102 may provide an alert and/or may send an alert to the second electronic device 116 and the third electronic device.

In some examples, remote monitoring of separation may be beneficial. For example, some electronic devices (without storing group information, for instance) may pass data to a remote electronic device (that has the group information, for example) to perform the separation monitoring. For example, respective group devices may be associated with (e.g., included in) packages for delivery from a delivery truck. Without the group devices monitoring for separation in some examples, a remote server may identify if the electronic devices are on a correct delivery truck. As the packages are delivered, the driver may be alerted that not all of a group of packages for a delivery address are close together and/or that one of the group of packages is separated from the group (e.g., is left on the truck).

Figure 2:
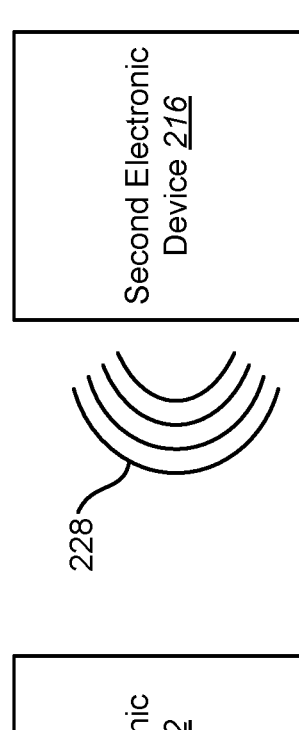
FIG. 2 is a diagram illustrating an example of a first electronic device that may be utilized to monitor device separation.
Figure 2:
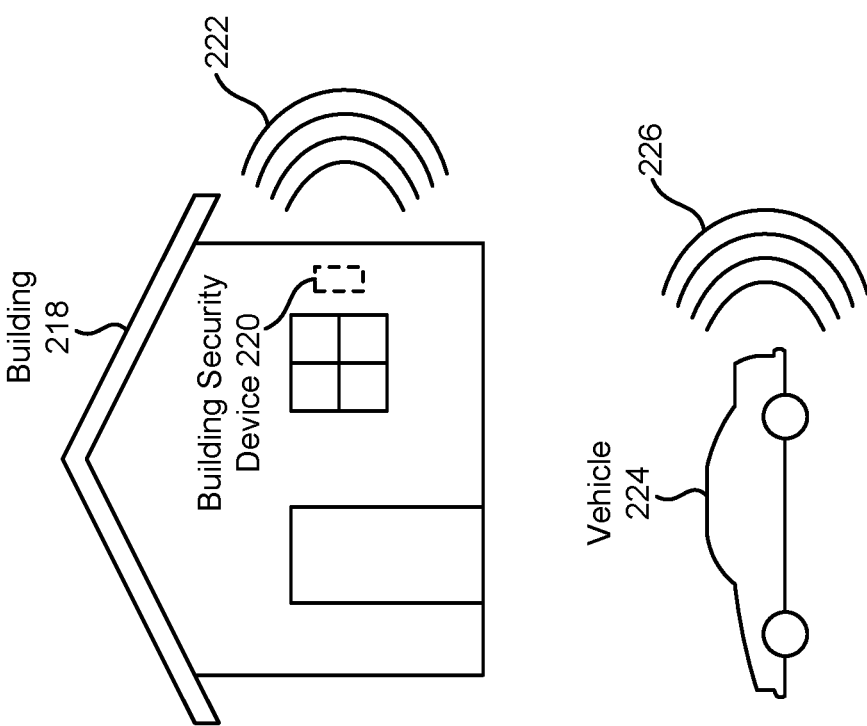

FIG. 2 is a diagram illustrating an example of a first electronic device 202 that may be utilized to monitor device separation. The first electronic device 202 may be an example of the first electronic device described in FIG. 1. FIG. 2 also illustrates examples of a building 218 (e.g., house, office, facility, etc.) with a building security device 220, a vehicle 224, and a second electronic device 216. The second electronic device 216 may be an example of the second electronic device 116 described in FIG. 1. FIG. 2 illustrates examples of zone type switch events that may occur and/or may be detected by the first electronic device 202 as described herein.

In some examples, the first electronic device 202 may monitor for separation from the second electronic device 216 based on a geographic location detection zone. For example, the first electronic device 202 may monitor for a case that the first electronic device 202 is located outside of the geographic location detection zone from the second electronic device 216. For instance, the first electronic device 202 may determine whether the first electronic device 202 is within a geographic distance from the second electronic device 216 based on a location of the first electronic device 202 and a location associated with the second electronic device 216.

In some examples, the first electronic device 202 may detect a zone type switch event based on a wireless signal 226 from the vehicle 224. For instance, a wireless signal 226 from the vehicle 224 may become detectable after activation of the vehicle 224. The first electronic device 202 may detect a zone type switch event by detecting the wireless signal 226 from the vehicle 224 (or by detecting a loss of the wireless signal 226 from the vehicle 224, for example). In response to detecting the wireless signal 226 (e.g., beacon) from the vehicle, the first electronic device 202 may switch to monitor for separation from the second electronic device 216 based on a wireless detection zone. For instance, detection of the wireless signal 226 may indicate that a user is about to drive away, in which case it may be beneficial to switch to a more sensitive wireless detection zone to alert a user about a separation from the second electronic device 216.

In some examples, the first electronic device 202 may detect a zone type switch event based on a building security device 220 status. For instance, the first electronic device 202 may detect a zone type switch event by detecting arming (or disarming, for example) of the building security device 220. In some examples, the first electronic device 202 may receive a signal 222 from the building security device 220 (e.g., through a network or networks) indicating that the building security device 220 has changed status to armed. In some examples, the first electronic device 202 may detect an activity of the first electronic device 202 (e.g., receiving an input and/or sending a signal to arm the building security device 220). In response to detecting the armed status of the building security device 220, the first electronic device 202 may switch to monitor for separation from the second electronic device 216 based on a wireless detection zone. For instance, detection of the arming of the building security device 220 may indicate that a user is about to leave, in which case it may be beneficial to switch to a more sensitive wireless detection zone to alert a user about a separation from the second electronic device 216.

When monitoring for separation from the second electronic device based on a wireless detection zone, the first electronic device 202 may determine whether a wireless signal 228 is received from the second electronic device 216 and/or whether a signal quality of the wireless signal 228 satisfies a criterion or criteria (e.g., threshold). If the wireless signal 228 is not detected and/or does not meet the criterion or criteria, the first electronic device 202 may provide an alert indicating separation from the second electronic device 216.

Figure 3:
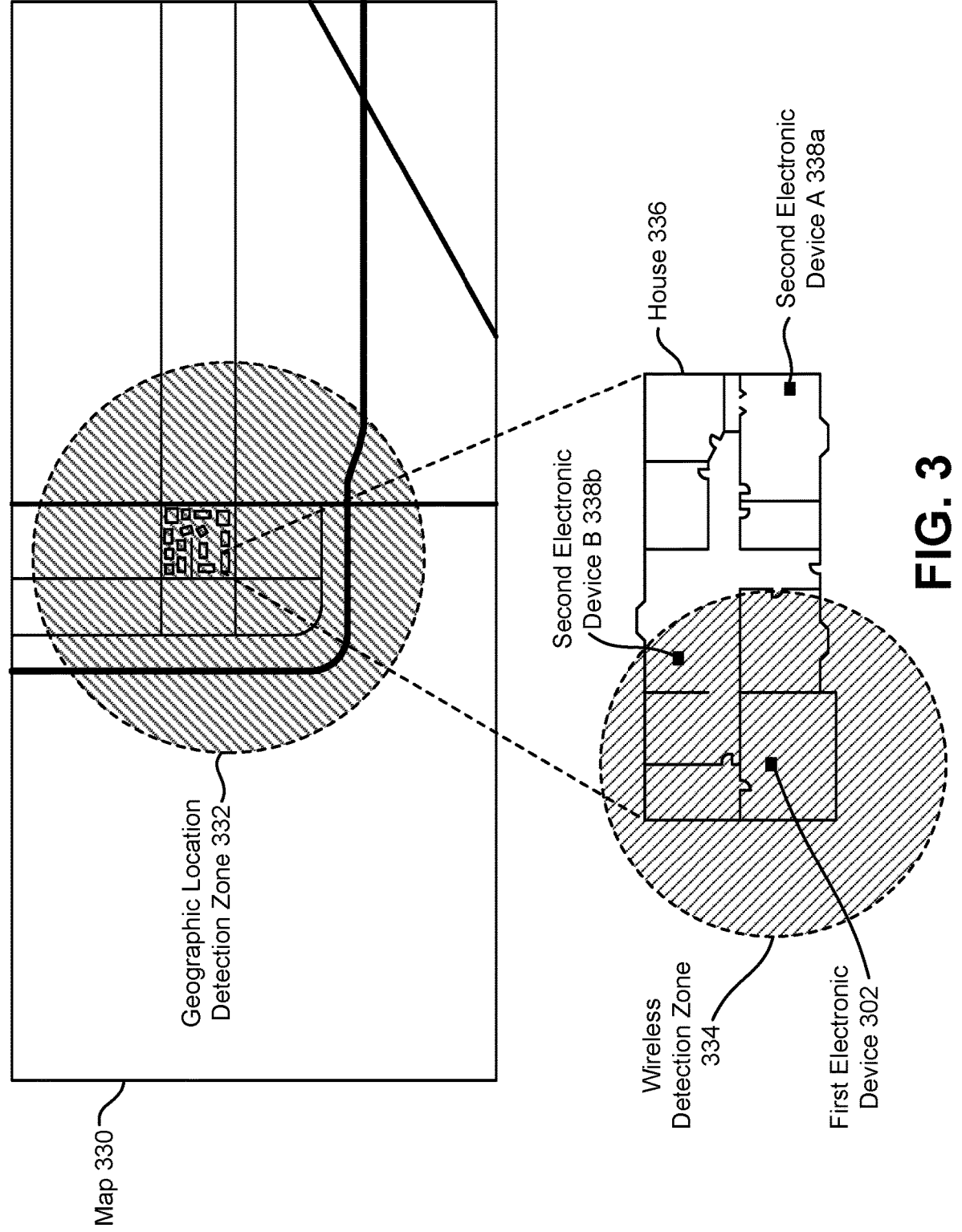
FIG. 3 is a diagram illustrating examples of a geographic location detection zone and a wireless detection zone that may be utilized to monitor device separation.

FIG. 3 is a diagram illustrating examples of a geographic location detection zone 332 and a wireless detection zone 334 that may be utilized to monitor device separation. FIG. 3 also illustrates an example of an aerial view of a geographic map 330 and an expanded view of a floor plan of a house 336 on the map 330. Examples of a first electronic device 302 and second electronic devices 338*a-b* are also illustrated. The first electronic device 302 may be an example of the first electronic device 102, 202 described in FIG. 1 and/or FIG. 2. The second electronic devices 338*a-b* may be an example of the second electronic device 116, 216 described in FIG. 1 and/or FIG. 2. The first electronic device 302 and the second electronic devices 338*a-b* may be examples of group devices.

In some examples, the geographic location detection zone 332 is larger than the wireless detection zone 334. For example, a geographic location detection zone 332 may have a range of approximately 2 miles (e.g., a 1-mile radius), while the wireless detection zone 334 may have a range of approximately 300 feet (e.g., 150-foot radius). In some examples, the geographic location detection zone 332 may be utilized to cover a larger area (e.g., the house 336 and a distance around the house 336). This may avoid false alerts while group devices (e.g., the first electronic device 302 and the second electronic devices 338*a-b*) are within the house. For instance, if the wireless detection zone 334 were used instead of the geographic detection zone 332, a false alert may be triggered when second electronic device A 338*a* is out of range of the first electronic device 302 in the house 336 due to the smaller range of the wireless detection zone 334. Accordingly, a geographic location detection zone 332 may be utilized until a zone type switch event is detected in some examples.

In some examples, the first electronic device 302 may detect a zone type switch event based on a wireless signal from a vehicle. For instance, in FIG. 3, the first electronic device 302 may be located in a vehicle in a garage of the house 336. When the vehicle is activated, the vehicle may produce a wireless signal (e.g., Bluetooth beacon), which may be utilized by the first electronic device 302 may execute a zone type switch from the geographic location detection zone 332 to the wireless detection zone 334. In this case, the first electronic device 302 may raise an alert that second electronic device A 338*a* is separated in response to not receiving a wireless signal (e.g., beacon) from second electronic device A 338a. The first electronic device 302 may also raise an alert that second electronic device B 338b is separated in response to determining that a signal strength of a wireless signal (e.g., beacon) from second electronic device B 338b is less than a threshold.

In some examples, identifying a device identifier (e.g., Bluetooth identifier) associated with a vehicle's embedded electronics (e.g., radio, media device, etc.) may enable improving the user experience with device tracking and co-location grouping. For instance, a device identifier associated with a vehicle may be detectable when a vehicle is activated, which may provide an inherent indication that a user is likely about to leave a certain location (e.g., the house 336). For example, the first electronic device 302 may store a device identifier associated with the vehicle. Accordingly, the first electronic device 302 may utilize the detection of a vehicle's device identifier to switch zone types and provide an alert that the second electronic device A 338a and/or the second electronic device B 338b may be separated from the first electronic device 302 (e.g., from the group).

Table (1) provides an example of a tracking scenario for electronic devices after switching to the wireless detection zone 334. Table (1) may illustrate examples of signal strength measurements (e.g., RSSI) taken by the first electronic device 302 and locations of corresponding second electronic devices 338a-b in the house 336.

TABLE 1

| Device | Signal Strength | Location |
|---|---|---|
| Vehicle | −34 dBm | Garage |
| Second electronic device B 338b (e.g., laptop computer) | −78 dBm | Kitchen |
| Second Electronic Device A 338a (e.g., tracker with wallet) | N/A | Bedroom |

In the tracking scenario example of Table (1), the first electronic device 302 may switch from the geographic location detection zone to the wireless detection zone 334 upon detecting the wireless signal from the vehicle. The first electronic device 302 may provide an alert that the second electronic device A 338a and/or the second electronic device B 338b may be separated from the first electronic device 302 (e.g., from the group).

Figure 4:
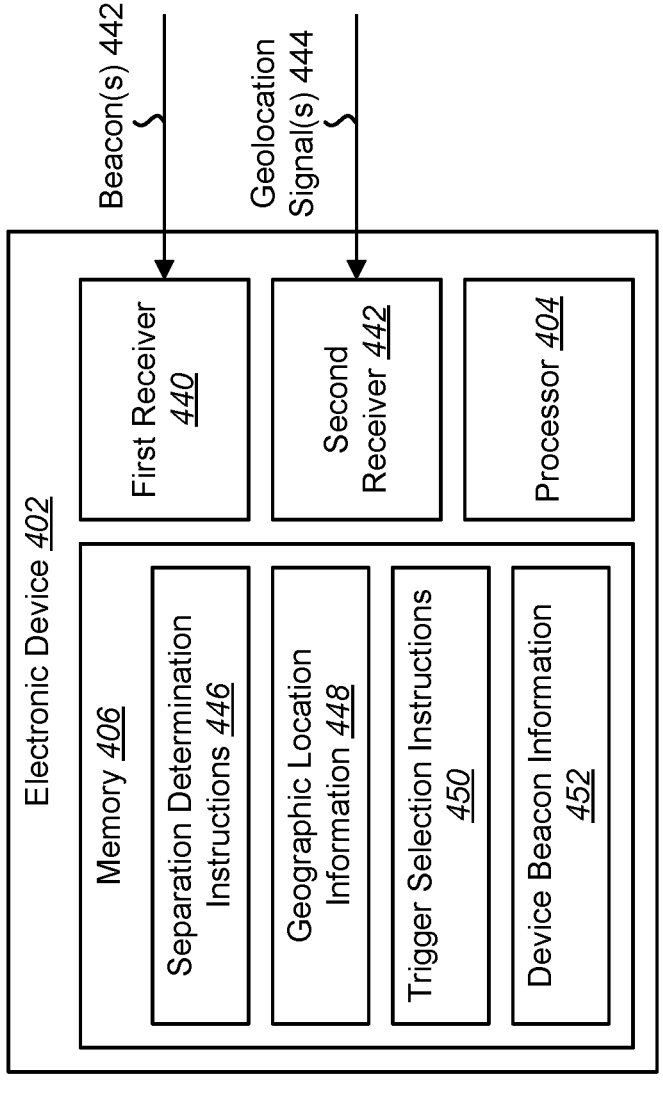
FIG. 4 is a block diagram of an example of an electronic device that may be utilized for device separation determination.

FIG. 4 is a block diagram of an example of an electronic device 402 that may be utilized for device separation determination. The electronic device 402 may be a device that communicates with a remote device or devices. For example, the electronic device 402 may receive a beacon or beacons 442 for locating and/or tracking a remote device or devices. Some examples of the electronic device 402 include smartphones, laptop computers, tablet devices, game consoles, mobile devices, Bluetooth devices, Bluetooth modules, etc. In some examples, the electronic device 402 may be an example of the first electronic device 102, 202, 302 described in FIG. 1, FIG. 2, and/or FIG. 3. In some examples, the electronic device 402 may perform one, some, or all of the functions, operations, elements, procedures, etc., described in one, some, or all of FIG. 1-6.

In some examples, the electronic device 402 may include memory 406 and/or a processor 404. The processor 404 may be in electronic communication with the memory 406. The memory 406 may be an example of the memory 106 described in FIG. 1. The processor 404 may be an example of the processor 104 described in FIG. 1.

In some examples, the electronic device 402 may include a first receiver 440. The first receiver 440 may be circuitry to receive and/or de-format (e.g., decode, decrypt, unscramble, etc.) a beacon or beacons 442. For example, the first receiver 440 may receive device beacon information 452 (based on a beacon or beacons 442, for instance). The device beacon information 452 may be stored in the memory 406. Device beacon information 452 may include and/or indicate information corresponding to a remote device or devices and/or corresponding to a wireless signal or signals (e.g., device identifier(s), signal quality measurement(s) and/or indicators).

In some examples, the electronic device 402 may include a second receiver 442. The second receiver 442 may be circuitry to receive and/or de-format (e.g., decode, decrypt, unscramble, etc.) a geolocation signal or signals 444. A geolocation signal may include information for determining a location of the electronic device 402. In some examples, the geolocation signal(s) 444 may be GPS signals, where the electronic device 402 may detect distances and/or timing from GPS satellites to determine the geographic location of the electronic device 402, which may be stored as geographic location information 448. For example, the second receiver 442 may receive geographic location information 448 (based on a geolocation signal or signals 444, for instance). The geographic location information 448 may be stored in the memory 406. Geographic location information 448 may include and/or indicate information (e.g., coordinates) indicating a location of the electronic device 402. In some examples, the first receiver 440 and/or the second receiver 442 may be coupled to an antenna or antennas (e.g., the same antenna(s) or separate antenna(s)).

In some examples, the memory 406 may include separation determination instructions 446, geographic location information 448, trigger selection instructions 450, and/or device beacon information 452. The processor 404 may execute the instructions stored in the memory 406 to perform an operation or operations using the information stored in the memory 406.

In some examples, the processor 404 may select a trigger from a geographic location trigger and a wireless signal trigger based on whether the device beacon information 452 indicates a vehicle beacon. For example, the processor 404 may execute the trigger selection instructions 450 to select a trigger from a geographic location trigger and a wireless signal trigger based on whether the device beacon information 452 indicates a vehicle beacon. A geographic location trigger may be a condition indicating whether a remote device is separated from the electronic device 402 based on geographic location. The geographic location trigger may be an example of a geographic location detection zone or zones described herein. The wireless signal trigger may be a condition indicating whether a remote device is separated from the electronic device 402 based on a wireless signal (e.g., beacon(s) 442). The wireless signal trigger may be an example of a wireless detection zone or zones described herein.

In some examples, the processor 404 may select a wireless signal trigger in a case that the device beacon information 452 indicates a vehicle beacon. For example, if the device beacon information 452 indicates that a beacon 442 has been received from a registered and/or user-specified vehicle (within a period, for instance), the processor 404 may select the wireless signal trigger.

In some examples, the processor 404 may select a geographic location trigger in a case that the device beacon information 452 does not indicate a vehicle beacon. For example, if the device beacon information 452 indicates that a beacon 442 has not been received from a registered and/or user-specified vehicle (within a period, for instance), the processor 404 may select the geographic location trigger.

In some examples, the processor 404 may determine whether a group device is separated from the electronic device 402 in response to the selected trigger. For example, the processor 404 may execute the separation determination instructions 446 to determine whether a group device is separated from the electronic device 402 based on the selected trigger.

In some examples, the processor 404 may detect the geographic location trigger based on the geographic location information in a case that the device beacon information 452 does not indicate a vehicle beacon. In some examples, the processor 404 may detect the wireless signal trigger based on the device beacon information 452 in a case that the device beacon information 452 indicates the vehicle beacon. Detecting the selected trigger may indicate a separation of the group device from the electronic device 402. In some examples, detecting the geographic location trigger and/or the wireless signal trigger may be performed as described in FIG. 1, FIG. 2, and/or FIG. 3.

In some examples, the processor 404 may provide an alert in response to determining that the group device is separated from the electronic device in response to the selected trigger. In some examples, providing an alert may be performed as described in FIG. 1. For instance, the electronic device 402 may include an output device or output devices. Examples of output devices may include speaker(s), display(s), transmitter(s), haptic device(s), etc. The processor 404 may provide a signal, data, and/or instruction to an output device or devices to output an alert as a sound, audio, speech, tone, visual indicator (e.g., display flash, characters, etc.), text message, phone call, and/or haptic indicator, etc.

FIG. 5 is a block diagram illustrating an example of a computer-readable medium 554 for tracking group device separation. The computer-readable medium 554 may be a non-transitory, tangible computer-readable medium 554. The computer-readable medium 554 may be, for example, RAM, EEPROM, a storage device, an optical disc, and the like. In some examples, the computer-readable medium 554 may be volatile and/or non-volatile memory, such as DRAM, EEPROM, MRAM, PCRAM, memristor, flash memory, and the like. In some examples, the computer-readable medium 554 described in FIG. 5 may be an example of the memory 106 described in FIG. 1 or memory 406 described in FIG. 4. In some examples, code (e.g., data and/or executable code or instructions) of the computer-readable medium 554 may be transferred and/or loaded to memory or memories of an electronic device.

The computer-readable medium 554 may include code (e.g., data and/or executable code or instructions). For example, the computer-readable medium 554 may include group device separation tracking instructions 556, vehicle activation detection instructions 558, and/or tracking switching instructions.

In some examples, the group device separation tracking instructions 556 may be code to cause a processor to track group device separation based on a geographic location of a device relative to a geographic zone. The geographic zone may be an example of the geographic location detection zone described in FIG. 1, FIG. 2, FIG. 3, and/or of the geographic location trigger described in FIG. 4. For example, a processor may detect whether the device is separated from a remote device based on a geographic location detection zone corresponding to the remote device as described in FIG. 1, FIG. 2, FIG. 3, and/or FIG. 4.

In some examples, the vehicle activation detection instructions 558 may be code to cause a processor to detect that a vehicle is activated based on a wireless signal. For example, the code to cause the processor to detect that the vehicle is activated may include code to cause the processor to compare a received identifier with a stored vehicle identifier as described in FIG. 1, FIG. 2, FIG. 3, and/or FIG. 4. For instance, the processor may detect that the vehicle is activated when a beacon is received with an identifier that matches the stored vehicle identifier.

In some examples, the tracking switching instructions 560 may be code to cause a processor to switch to track group device separation based on wireless signal detection in response to detecting that the vehicle is activated. For example, the processor may switch from tracking group device separation using a geographic zone (e.g., geographic location detection zone) to tracking group device separation using wireless signal detection as described in FIG. 1, FIG. 2, FIG. 3, and/or FIG. 4. In some examples, wireless signal detection may be performed within a wireless signal detection range. A wireless signal detection range may be a range (e.g., area, zone, etc.) in which a wireless signal may be detected (e.g., received). In some examples, the wireless signal detection range may be an example of the wireless detection zone described in FIG. 1, FIG. 2, FIG. 3, and/or of the wireless signal trigger described in FIG. 4. In some examples, the geographic zone (e.g., a zone with a 2-mile radius) may be larger than the wireless signal detection range (e.g., a range with a 150-foot radius). For instance, the geographic zone may include a larger area than the wireless signal detection range.

Figure 6:
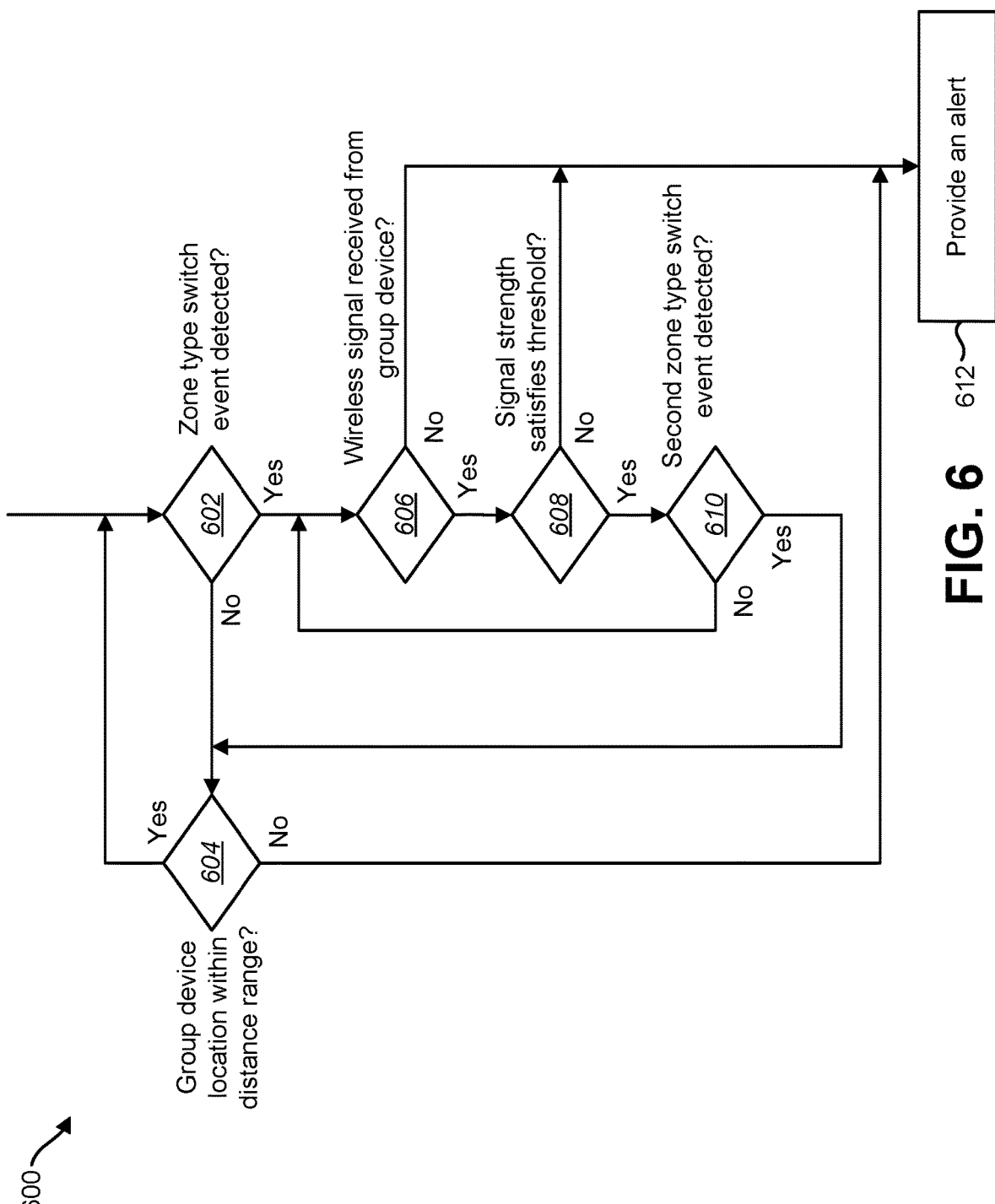
FIG. 6 is a flow diagram illustrating an example of a method for switching device separation monitoring.

FIG. 6 is a flow diagram illustrating an example of a method 600 for switching device separation monitoring. The method 600 and/or an element or elements of the method 600 may be performed by an electronic device. For example, the method 600 may be performed by the electronic device 102, 202, 302, 402 described in FIG. 1, FIG. 2, FIG. 3, and/or FIG. 4, any of which may be referred to generally as an "electronic device" in FIG. 6. In some examples, the method 600 may be performed using an instruction or instructions described in FIG. 1, FIG. 4, and/or FIG. 5. In some examples, the method 600 may be performed by an electronic device (e.g., a tracking device, a Bluetooth device, an IoT device, etc.). For example, the method 600 may be performed by an electronic device that monitors group device separation.

An electronic device may determine 602 whether a zone type switch event is detected. In some examples, detecting a zone type switch event may be performed as described in FIG. 1, FIG. 2, FIG. 3, FIG. 4, and/or FIG. 5.

In a case that a zone type switch event is not detected, the electronic device may determine 604 whether a location associated with a group device (e.g., a record of a group device location) is within a distance range from a location of the electronic device. In some examples, this may be accomplished as described in FIG. 1, FIG. 2, FIG. 3, FIG. 4, and/or FIG. 5. In a case that the location of the group device is within the distance range, the electronic device may return to determining 602 whether a zone type switch event is detected.

In a case that the location associated with the group device is not within the distance range (e.g., a distance range between the electronic device and the group device), the electronic device may provide 612 an alert. In some examples, this may be accomplished as described in FIG. 1, FIG. 2, FIG. 3, FIG. 4, and/or FIG. 5. In some examples, the alert may be provided 612 for a group device that is or group devices that are not within a distance range or ranges.

In a case that a zone type switch event is detected, the electronic device may determine 606 whether a wireless signal (e.g., beacon) is received from the group device. In a case that the wireless signal is not received from the group device, the electronic device may provide 612 an alert. In some examples, this may be accomplished as described in FIG. 1, FIG. 2, FIG. 3, FIG. 4, and/or FIG. 5. In some examples, the alert may be provided 612 for a group device or group devices for which a wireless signal is not received.

In a case that a wireless signal is received from the group device, the electronic device may determine 608 whether a signal strength satisfies a threshold. In a case that the signal strength does not satisfy the threshold, the electronic device may provide 612 an alert. In some examples, this may be accomplished as described in FIG. 1, FIG. 2, FIG. 3, FIG. 4, and/or FIG. 5. In some examples, the alert may be provided 612 for a group device or group devices for which a signal strength does not satisfy a threshold or thresholds.

In a case that a signal strength satisfies the threshold, the electronic device may determine 610 whether a second zone type switch event is detected. In some examples, the second zone type switch event is an event to switch to monitoring based on the geographic location detection zone. Examples of the zone type switch event may include detecting a loss of a wireless signal from a vehicle, detecting a reduction in wireless signal quality (e.g., signal quality below a threshold) from a vehicle, detecting disarming of a building security device, etc. In a case that a second zone type switch event is not detected, the electronic device may return to determining 606 whether a wireless signal is received from a group device (e.g., may continue monitoring based on the wireless detection zone). In some examples, this may be accomplished as described in FIG. 1 and/or FIG. 2.

In some examples, the method 600 may be performed for multiple group devices. For instance, the electronic device may monitor for multiple group devices using a geographic location detection zone or zones and/or using a wireless detection zone or zones.

As used herein, the term "and/or" may mean an item or items. For example, the phrase "A, B, and/or C" may mean any of: A (without B and C), B (without A and C), C (without A and B), A and B (but not C), B and C (but not A), A and C (but not B), or all of A, B, and C.

While various examples are described herein, the disclosure is not limited to the examples. Variations of the examples described herein may be within the scope of the disclosure. For example, operations, functions, aspects, or elements of the examples described herein may be omitted or combined.

The invention claimed is:

1. An electronic device, comprising:
   a memory;
   a processor in electronic communication with the memory, wherein the processor is to:
      monitor for separation from a second electronic device based on a geographic location detection zone, wherein to monitor for separation from the second electronic device based on the geographic location detection zone, the processor is to:
         determine whether a first electronic device location is outside of the geographic location detection zone from the second electronic device; and provide an alert in response to determining that the first electronic device location is outside of the geographic location detection zone;
      while monitoring for separation from the second electronic device based on the geographic location detection zone, detect a zone type switch event; and
      monitor for separation from the second electronic device based on a wireless detection zone in response to detecting the zone type switch event.

2. The electronic device of claim 1, wherein to detect the zone type switch event, the processor is to detect a wireless signal from a vehicle.

3. The electronic device of claim 1, wherein to detect the zone type switch event, the processor is to detect satisfaction of a proximity criterion based on a wireless signal from a vehicle.

4. The electronic device of claim 1, wherein the processor is to detect the zone type switch event by detecting arming of a building security device.

5. The electronic device of claim 1, wherein to monitor for separation from the second electronic device based on the wireless detection zone, the processor is to determine whether a wireless signal is received from the second electronic device.

6. The electronic device of claim 5, wherein to monitor for separation from the second electronic device based on the wireless detection zone, the processor is to:
   determine whether a strength of the wireless signal satisfies a threshold in response to determining that the wireless signal is received from the second electronic device; and
   provide an alert in response to determining that the strength of the wireless signal does not satisfy the threshold.

7. The electronic device of claim 1, wherein the processor is to:
   while monitoring for separation from the second electronic device based on the wireless detection zone, detect a second zone type switch event; and
   monitor for separation from the second electronic device based on the geographic location detection zone in response to detecting the second zone type switch event.

8. The electronic device of claim 7, wherein to detect the second zone type switch event, the processor is to detect a loss of a wireless signal from a vehicle.

9. The electronic device of claim 1, wherein to monitor for separation from the second electronic device based on the geographic location detection zone, the processor is to utilize a position of the electronic device and a position of the second electronic device.

10. A non-transitory tangible computer-readable medium comprising instructions when executed cause a processor of an electronic device to:
   track group device separation based on a geographic location of a device relative to a geographic zone, wherein to track group device separation, the processor is to:
      determine whether the device is outside of the geographic zone; and
      provide an alert in response to determining that the device is outside of the geographic zone;
   while tracking group device separation based on the geographic location of the device relative to the geographic zone, detect that a vehicle is activated based on a wireless signal; and switch to track group device separation based on wireless signal detection in response to detecting that the vehicle is activated.

11. The computer-readable medium of claim 10, wherein the instructions when executed further cause the processor to compare a received identifier with a stored vehicle identifier.

12. The computer-readable medium of claim 10, wherein the geographic zone is larger than a wireless signal detection range.

13. The computer-readable medium of claim 10, wherein the instructions when executed cause the processor to detect that the vehicle is activated by comparing a vehicle identification information stored in the electronic device with identifier information from the wireless signal.

14. The computer-readable medium of claim 10, wherein the instructions when executed cause the processor to track group device separation based on the geographic location of the device relative to the geographic zone without using a beacon signal between the device and another device.

15. The computer-readable medium of claim 10, wherein the instructions when executed cause the processor to track group device separation based on wireless signal detection without using a geographic location.

16. The computer-readable medium of claim 10, wherein the instructions when executed cause the processor to, while tracking group device separation based on wireless signal detection, provide an alert in response to determining that a strength of the wireless signal does not satisfy a threshold.

17. The computer-readable medium of claim 10, wherein the instructions when executed cause the processor to:

while tracking group device separation based on the wireless signal detection, detect that the vehicle is deactivated based on the wireless signal; and switch to track group device separation based on the geographic location of the device relative to the geographic zone in response to detecting that the vehicle is deactivated.

18. The computer-readable medium of claim 17, wherein the instructions when executed cause the processor to detect that the vehicle is deactivated by detecting a loss of the wireless signal from the vehicle.

* * * * *